United States Patent

Menke

Patent Number: 5,520,806
Date of Patent: May 28, 1996

[54] APPARATUS FOR GAS BUBBLE FLOTATION

[76] Inventor: Lucas Menke, Prälat-Zistl-Strasse 12, 80331 München, Germany

[21] Appl. No.: 378,817

[22] Filed: Jan. 27, 1995

[30] Foreign Application Priority Data

Mar. 3, 1994 [DE] Germany ............ 44 07 064.0

[51] Int. Cl.$^6$ ................................ C02F 1/24
[52] U.S. Cl. ................. 210/221.200; 210/703; 210/704
[58] Field of Search ............... 210/194, 195.1, 210/221.1, 221.2, 519, 532.1, 525, 703, 704

[56] References Cited

U.S. PATENT DOCUMENTS

| | | |
|---|---|---|
| 2,920,763 | 1/1960 | Lind . |
| 3,015,396 | 1/1962 | Quast . |
| 3,117,082 | 1/1964 | Schluter . |
| 3,809,240 | 5/1974 | Savall . |
| 4,620,926 | 11/1986 | Linck . |
| 5,176,835 | 1/1993 | Perletti . |

FOREIGN PATENT DOCUMENTS

| | | |
|---|---|---|
| 228396 | 7/1987 | European Pat. Off. . |
| 442463 | 8/1991 | European Pat. Off. . |
| 1536599 | 7/1968 | France . |
| 807262 | 6/1951 | Germany . |
| 2713088 | 9/1977 | Germany . |
| 3634903 | 10/1986 | Germany . |
| 3839371 | 5/1990 | Germany . |
| 930951 | 7/1963 | United Kingdom . |

OTHER PUBLICATIONS

B. Eppler, *Flotation als modernes Verfahren in industriellen und kommunalen Klaeranlagen*, 3R International, Apr. 1993, pp. 210–215.

Primary Examiner—Thomas M. Lithgow
Attorney, Agent, or Firm—Foley & Lardner

[57] ABSTRACT

An apparatus for gas bubble flotation comprises an angular flotation tank (1a, 1b), at least one liquid inlet (2a, 2b) for a liquid containing suspended matter and a liquid admixed with gas bubbles, in which apparatus at least one liquid inlet (2a, 2b) is arranged in the vicinity of at least one flotation tank corner. Preferably, the flotation tank has a square cross section. This permits optimal utilization of the available space, and results in a continuously decreasing flow velocity and thus an improved flotation effect.

13 Claims, 4 Drawing Sheets

APPARATUS FOR GAS BUBBLE FLOTATION

The invention relates to an apparatus for gas bubble flotation for separating solids from liquids.

DISCUSSION OF THE PRIOR ART

Gas bubble flotation is employed in the field of separating solids and liquids and especially in the sector of water treatment and wastewater treatment. This primarily involves applying the so-called dissolved-gas flotation, in which, in addition to a liquid containing solids or suspended matter, a liquid saturated with gas under pressure is added and is decompressed, so that as a result of the decompression gas bubbles are formed which attach themselves to the suspended matter to be separated and convey this to the surface in the flotation tank, so that it can be skimmed off there. The clear liquid freed of the suspended matter is discharged in the flotation tank bottom zone.

Previous apparatus for gas bubble flotation essentially comprise an air-dissolving apparatus in which, under elevated pressure, gas is dissolved in the liquid medium. After a certain retention time, the gas-liquid mixture is decompressed to a lower pressure, gas supersaturation of the liquid medium occurring as a result and the gas, no longer dissolved, being released in the form of fine microbubbles. The solids-containing liquid is preferably admixed, prior to being passed into the flotation tank, with a precipitation or flocculation aid, to enable conversion of the substances to be separated into floccular form.

The flotation tanks are either of round or of rectangular shape. In the rectangular flotation tanks, one side of the rectangle is usually made distinctly longer than the other side, and the inflow of the liquid containing suspended matter always takes place frontally, distributed over the shorter side of the rectangle. Flow takes place longitudinally through the system, the clear water being drawn off at the second short side situated opposite the inflow side.

The flow velocity in the previously known rectangular flotation systems through which flow takes place in the longitudinal direction is uniform and virtually constant. In order to achieve lower flow velocities by means of a larger volume, the flotation tanks are constructed so as to be relatively deep. A significant drawback of this known system is that a larger volume, compared to round flotation tanks, is required while at the same time the specific load-handling capacity of the system is lower. While system configurations are known in which it was possible to increase the capacity of such rectangular systems by fitting oblique lamellae, this results in the drawback of a higher sensitivity to fouling.

SUMMARY OF THE INVENTION

Therefore, the object of the invention is to specify an apparatus for gas bubble flotation in accordance with the preamble of claim 1, which is distinguished by a small overall size, while at the same time a high separation efficiency is to be achieved. Moreover, the apparatus according to the invention is to utilize the available space as efficiently as possible.

According to the invention, this object is achieved by an apparatus for gas bubble flotation which comprises an angular flotation tank, at least one liquid inlet for a liquid containing suspended matter and a liquid admixed with gas bubbles, wherein at least one liquid inlet is arranged in the vicinity of at least one flotation tank corner. Advantageous improvements of the inventive idea of the invention will become apparent from the subordinate claims.

The essential advantages of the invention consist in optimal utilization of the available space being possible as a consequence of the angular, preferably right-angled triangular or square type of construction of the flotation tank. Compared to a round tank this results in an increase in the flotation tank cross-sectional area, given the fact that the space available for system is usually rectangular. Causing the liquid containing suspended matter to flow in the corner zone advantageously gives rise to a continuously decreasing flow velocity, which results in an improved flotation effect compared to the conventional rectangular tanks. In this respect, the invention combines the advantages of the two previous concepts of the round flotation tank with central inflow on the one hand and the rectangular flotation tank with inflow along a side wall on the other hand.

The invention is particularly suitable for separating solid and liquid phases, especially for separating solids and lipophilic substances from a liquid phase such as a suspension.

According to an advantageous embodiment of the invention, the flotation tank is designed to be essentially square or diamond-shaped, in each of two opposite corners at least one liquid inlet being provided. At the same time, preferably skimming or sweeping apparatus are provided for skimming the flotate in the flotation tank, which are aligned in the diagonals defined by the two corners not provided with liquid inlets. This design brings about efficient flotation combined with the best possible utilization of the available space. Although the square design of the flotation tank is preferred on practical grounds, a diamond-shaped design can also be employed if required.

According to an alternative improvement of the invention, the flotation tank has an essentially isosceles triangular or right-angled triangular horizontal projection. This triangular shape makes it possible to introduce the liquid containing suspended matter at the apex corner, the decelerating flow occurring in the direction of the opposite side wall, where skimming of the flotate can be carried out. This improvement has the further advantage that two or more triangular flotation tanks according to the invention can be put together, to achieve efficient utilization of the space available for system.

If two triangular flotation tanks are arranged in such a way that the liquid inlets are situated opposite one another, shared offtake devices for the flotate and the clarified liquid can advantageously be provided.

Preferably, the sweeping apparatus are designed as two counter-rotating multiple-paddle sweepers parallel to one another, between which a flotate discharge channel is arranged. In this arrangement it is expedient for a clear-liquid offtake line to be arranged underneath the discharge channel.

According to a further embodiment of the invention there is provided, underneath the skimming channel, a partition which divides the flotation tank into two triangular flotation subtanks. Thus it is possible, with a minor additional effort, to set up two separate flotation apparatus which are suitable for the flotation of different liquids or of liquids having different proportions or compositions of suspended matter. The offtake of the flotate or of the liquid free of suspended matter can take place, as required, via separate or shared offtake devices.

According to a yet further improvement of the invention there is provided, at the bottom of the flotation tank, at least one sediment scraper. In this arrangement there is preferably formed, at the tank bottom, a sludge offtake channel into which the at least one pivotable sediment scraper conveys sediment sludge. Advantageously, two sediment scrapers pivotable about vertical axes are arranged in association with each liquid inlet, the pivots of which scrapers are situated in the vicinity of the other container corners and whose swiveling ranges extend up to the vicinity of the liquid inlets.

In the present invention, there is preferably provided, in the tank corners, a liquid inlet for the liquid containing suspended matter and therebeneath a separate inlet for liquid containing gas bubbles, the inlet for liquid containing gas bubbles being designed as a depressurization valve. Owing to this direct decompression of pressurized gas-saturated liquid directly into the flotation tank, agglomeration of the gas bubbles formed can advantageous be avoided. Thus, optimal utilization of the gas bubbles is achieved, since it has been found that the smaller the gas bubbles are the better the flotation effect is.

By an improvement of the arrangement of a horizontally pivotable baffle above the liquid inlet, the ability to direct the liquid flow uniformly into all directions can be achieved.

BRIEF DESCRIPTION OF THE DRAWINGS

The invention is explained below in more detail with reference to the appended drawings, in which:

FIGS. 4a and 4b show two depictions of the liquid inlets with FIG. 4b being viewed in the direction of arrow A in FIG. 4a.

DESCRIPTION OF A PREFERRED EMBODIMENT

The course, in principle, of the flotation process is explained below with reference to the FIGS. 1 to 5, referring to the preferred application of the invention for wastewater treatment. The invention is not restricted to this application, however, and is suitable for all applications in which a liquid and a non-liquid and non-gaseous phase such as suspended matter, lipophilic substances or solids are to be separated. In particular, the invention can be used in the brewing sector.

Figure 1:
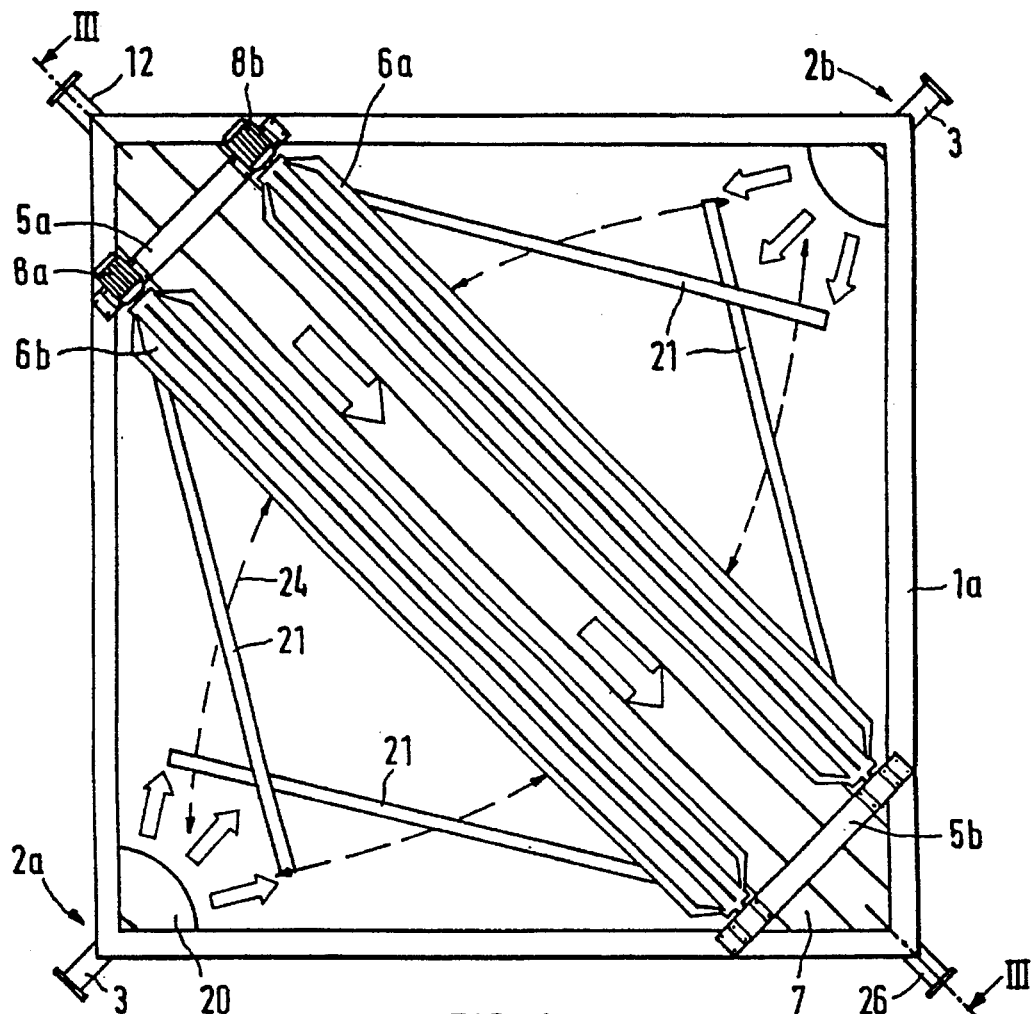
FIG. 1 shows a plan view of a flotation apparatus according to the invention
Figures 4A, 4B:
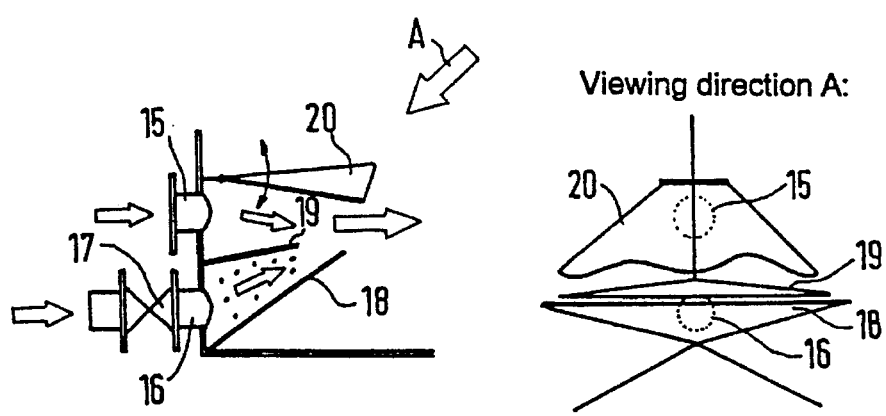

The flotation apparatus shown in FIG. 1 essentially comprises a square flotation tank 1a which, in the vicinity of two opposite corners, has one liquid inlet 2a and 2b each, which are each fed with liquid containing suspended matter via feeder pipes 3.

In the vicinity of the two other corners, two supports 5a, 5b are arranged, which support sweeping devices 6a, 6b in the form of paddle sweepers which, situated parallel next to one another, diagonally span the flotation tank 1a. The two paddle sweepers 6a, 6b each comprise a plurality of approximately radially projecting transfer lips, distributed about the circumference of the longitudinal axis, which dip into the flotate layer 10 forming at the surface of the tank contents and skim the flotate into a flotate discharge channel 7 arranged between the paddle sweepers 6a, 6b. The paddle sweepers 6a, 6b are individually set in rotation by means of drive motors 8a, 8b.

Figure 2:
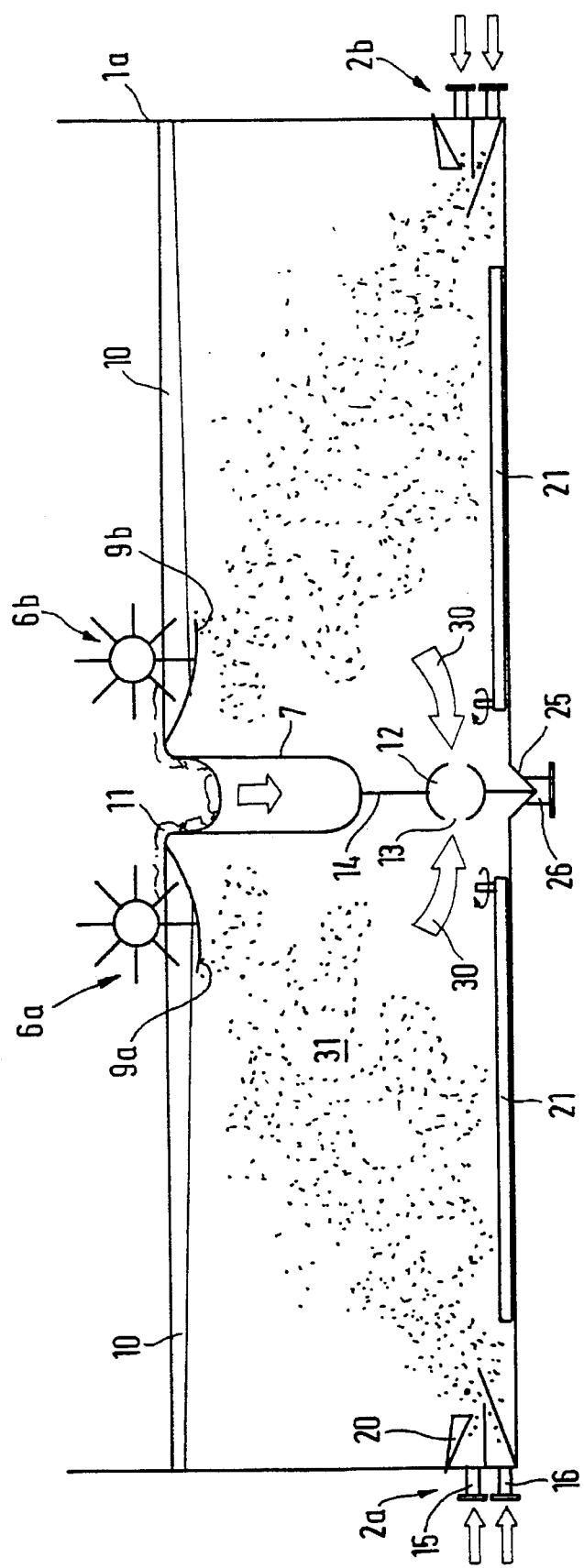
FIG. 2 shows a schematic, vertical diagonal section through a flotation tank.

As can be seen from FIG. 2, the flotate discharge channel 7 for the flotate has two channel-like baffles 9a, 9b, which dip into the flotate layer 10 and via which the flotate is conveyed by the paddle sweepers 6a, 6b into the channel 7 proper.

Figure 3:
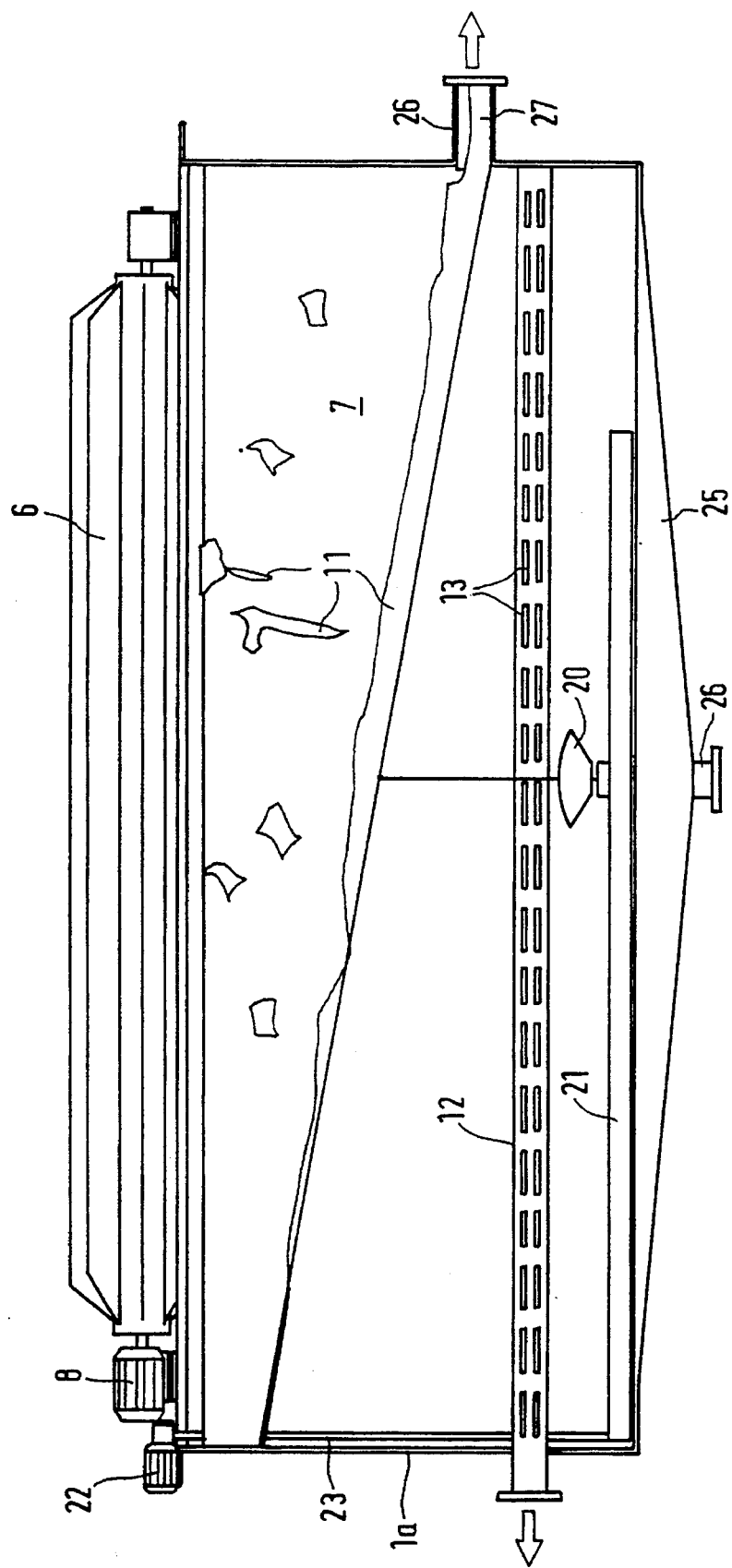
FIG. 3 shows a schematic view along the line III—III shown in FIG. 1.

In FIG. 3 it can be seen that the bottom of the flotate discharge channel 7 runs obliquely downward, in order to ensure discharge of the viscous flotate 11. The flotate discharge channel 7 is in turn connected to a flotate offtake line 27.

As depicted in the FIGS. 2 and 3, there is situated underneath the flotate discharge channel 7 a clear-water outflow pipe 12 which along its extension in the flotation tank 1a is provided with a multiplicity of passages 13 via which the clear water can enter in order to be removed from the flotation tank 1a.

According to an embodiment of the invention, the flotation tank 1a is divided into two separate subtanks by a diagonal partition 14 shown in FIG. 3, the partition 14 extending from below the flotate discharge channel 7 as far as the tank bottom. In this arrangement it is also possible to provide two separate clear-water outflow pipes in each subtank, or, as shown in FIG. 3, a shared clear-water outflow pipe 12 is used.

The water containing suspended matter is fed in, in the preferred embodiment shown of the invention, via the liquid inlets 2a and 2b in the tank corners. As shown in particular in FIGS. 4a and 4b, an inlet 15 for the liquid containing suspended matter is provided above an inlet 16 for gas-saturated pressurized liquid, the inlet 16 comprising a depressurization element 17 or itself being designed as such. The flows of liquid into unit 16 are guided by suitable baffles 18 and 19, in order to achieve as favorable a distribution as possible in the horizontal direction and mixing of the two fluid flows. Above the inlet 15 for the liquid containing suspended matter there is arranged a preferably pivotable inflow screen 20, so as to be able to optimally set the course of the flow as a function of throughput, pollution level or other parameters.

At the bottom of the flotation tank 1a, a plurality of sediment scrapers 21 are provided in the preferred embodiment, which are arranged, in the vicinity of the tank corners not provided with liquid inlets 2a, 2b, so as to be pivotable about vertical axes. By way of example, FIG. 3 depicts a drive unit 22 which, via a shaft 23, swivels the associated sediment scraper 21 along the swiveling range designated by the reference symbol 24 in FIG. 1. The sediment scraper(s) serve to push sediments deposited on the tank bottom into a sediment hopper 25 recessed in the tank bottom below the clear-water outflow pipe 12. As shown in FIG. 3, the sediment hopper 25 preferably has a V-shaped sectional profile and debouches into a sediment offtake line 26. Insofar as a partition 14 (FIG. 3) is provided in the flotation tank 1a, it preferably ends in the sediment hopper 25, with the possibility of sedimented material being pushed in by the sediment scrapers 21 from both sides of the partition 14.

Figure 5:
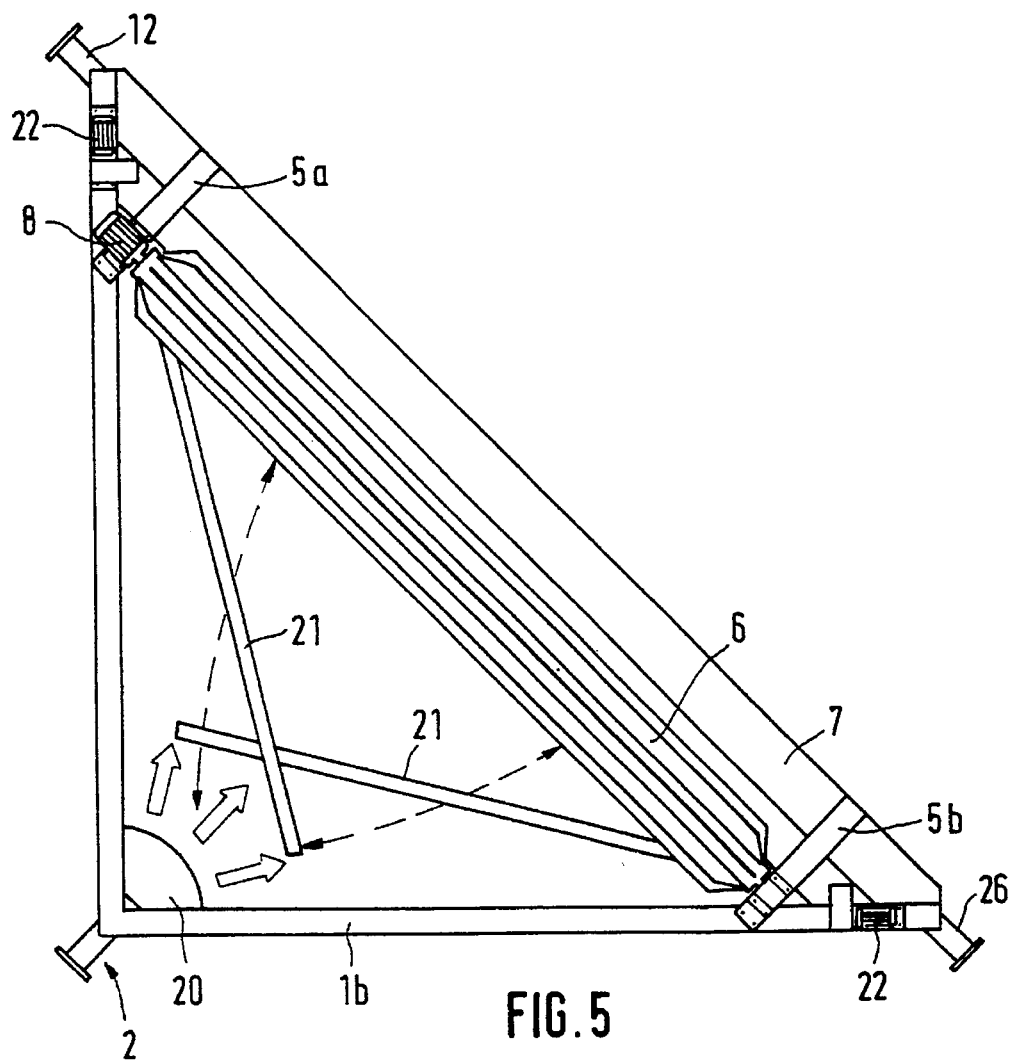
FIG. 5 shows an alternative embodiment of the flotation apparatus in cross section.

FIG. 5 depicts an alternative embodiment of the invention, which essentially corresponds to the embodiment depicted in FIGS. 1 to 4, so that a detailed description is not required. Identical reference symbols as in the other figures refer to identical parts.

The essential difference of this embodiment from that described above consists in the flotation tank 1b having a triangular horizontal projection, and only one paddle sweeper 6 being provided.

Figure 6:
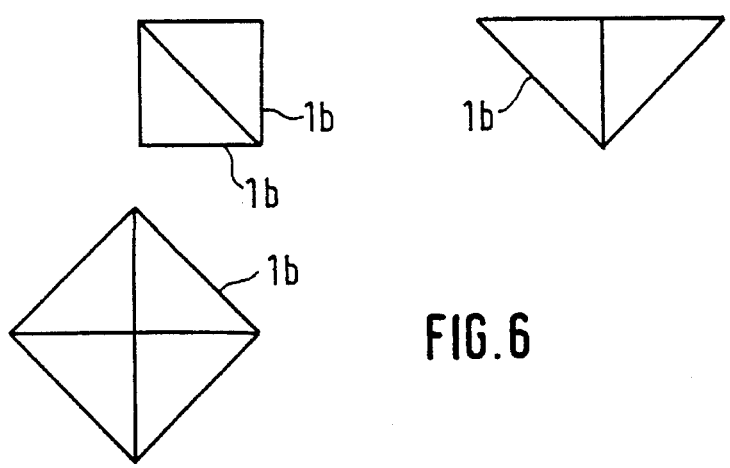
FIG. 6 shows system options for a plurality of flotation tanks according to FIG. 5.

From FIG. 6 it can be seen that the embodiment, shown in FIG. 5, of the flotation tank 1b permits many and diverse combination options of a plurality of flotation tanks, which provides for efficient adaptation to confined system areas in combination with the largest possible tank surface area.

The flotation process using the apparatus according to the invention is described below in detail.

The raw water from which the solids are to be separated is pumped by means of a pump (not shown) to the flotation tank 1a or 1b, respectively, in which the solid and liquid phase are separated, so that two branch streams are formed, namely the liquid, virtually solid-free clear phase 30 and the solid phase which can also be designated as the flotate and which contains the major proportion of the solids. The flotate in turn collects in the flotate layer 10. In the process, prior to the introduction into the flotation tank 1a or 1b, respectively, suitable chemicals can be added for the purpose of precipitation and/or flocculation, which serves to convert dissolved or partially dissolved, colloidal and free solids into floccular form.

In order to form gas bubbles, a suitable gas, for example air, is dissolved in an apparatus (not shown) under a pressure which preferably is distinctly above ambient pressure. The liquid phase containing the dissolved gas is introduced by means of the inlets 15, the high pressure being maintained, into the flotation tank 1a or beforehand decompressed into the inflow pipe, as a result of which fine microbubbles are formed.

The decompression of the gas bubble mixture, and the flow path are designed in such a way that there is formed, in the flotation tank 1a or 1b, respectively, a preferably horizontal two-layer flow. This comprises a gas bubble flow in the lower zone and a flow of the raw water in the upper zone of the flotation tank 1, containing the solids in flocculate form. Alternatively, the branch streams may also be mixed prior to entry into the flotation tank.

The gas bubbles 31 formed can adhere to the solids flocculae to be separated and thus cause separation by flotation of the flocculated solid composites.

The inflow in the case of tank 1a takes place, according to FIG. 1, from each of two opposite corners toward the center, the inflow being designed in such a way that a horizontal inflow in the lower zone of the flotation tank 1a or 1b, respectively, can be accomplished which is aligned toward the center.

Above the main inflow pipe there is situated the movably mounted inflow screen 20. This inflow screen 20 is designed in such a way that uniform inflow over an angle of 90° is possible. Since the inflow takes place from a corner of the basic square shape, the flow velocity immediately declines drastically, which creates ideal conditions for the flotation process. Owing to the low flow velocity, the gas bubbles can adhere to the solids/flocculae composites and cause these to float up.

In the center between the two opposite inflow points there are arranged, diagonally with respect to the square, both the clear-water outflow pipe 12 for the virtually solids-free clear phase and the sweeping apparatus 6 for the flotate sludge produced. The flotate/sludge phase moving toward the center is picked up with the aid of the two counter-rotating paddle sweepers 6a, 6b. As a result of the rotation of said paddle sweepers 6a, 6b, the flotate layer 10 is conveyed along the diagonal into the unilaterally or bilaterally inclined flotate discharge channel 7, whence the sludge 11 flows out and can be drawn off via the flotate offtake line 26.

The discharge of the clear phase is effected via the horizontal clear-phase outflow pipe 12 arranged diagonally in the bottom third of the flotation tank 1a, 1b and provided with passages 13, whose orifice cross sections preferably vary, so that uniform discharge over the entire length is possible.

Non-floating heavy dirt or sediments collect at the tank bottom. In order to remove these sediments from the flotation tank 1a or 1b, respectively, they are pushed, with the aid of the sediment scrapers 21, into the likewise diagonally arranged sediment hopper 25 at the tank bottom. Each half of the square, diagonally divided flotation tank 1a has two sediment scrapers 21 which rotate about a vertical axis. The axes are disposed on the tank outer wall near those corners of the square at which no inflow takes place. The bearing arrangement of the rotatable shafts 23 is attached to the tank outer wall. The sediment scrapers 21 themselves are attached, at one end, to the vertical scraper arbor and are designed in such a way that a rubber lip pushes the sediments collected at the bottom into the sediment hopper 25. The scraping process takes place at intervals as required by the application. The scraper arbor is driven by a geared motor 22. The scraping process takes place in such a way that, after reaching the sediment hopper 25, the sediment scraper 21 immediately moves back into its starting position.

The sediment scrapers 21 opposite one another in one tank half in this arrangement are operated alternately at intervals, so that any contact of the two sediment scrapers 21 is precluded.

Depending on requirements, the inflow into the system can be accomplished in such a way that raw water and gas bubble stream separately enter the flotation tank 1a or 1b, respectively. The feed of the gas bubble stream should in principle take place underneath the raw water stream, with the same or a greater velocity. Decompression of the pressurized saturated liquid-gas mixture can take place both before inflow into the flotation tank 1a or 1b, respectively, and in the tank itself.

I claim:

1. Apparatus for gas bubble flotation comprising:

a flotation tank which is essentially square or diamond shape in cross-section, liquid inlet means located in opposite corners of the tank and directed into the tank for admitting into the tank liquid containing suspended matter and liquid admixed with gas bubbles, and skimming devices for skimming the flotate in the tank, said skimming devices being aligned with a diagonal defined by and extending between the two corners of the tank not provided with liquid inlet means.

2. The apparatus as claimed in claim 1, wherein said tank is formed in its bottom wall with a sentiment outflow channel, and at least one sentiment scraper mounted for sweeping movement at the bottom of the tank for moving sediment sludge into said outflow channel.

3. The apparatus as claimed in claim 1, wherein said liquid inlet means comprises a first inlet for liquid containing suspended matter, and a second, separate inlet beneath said first inlet for liquid admixed with gas bubbles, said second inlet having associated therewith a depressurization element for avoiding agglomeration of the gas bubbles.

4. The apparatus of claim 3, further including a horizontally pivotable inflow screen mounted above said first inlet for directing liquid flow uniformly into the tank.

5. The apparatus as claimed in claim 1, wherein the skimming devices are designed as two multiple-paddle sweepers which are parallel to one another and between which a flotate discharge channel is arranged.

6. The apparatus as claimed in claim 5, wherein underneath the flotate discharge channel a clear-liquid outflow pipe is arranged.

7. The apparatus as claimed in claim 6, wherein underneath the flotate discharge channel a partition is provided which divides the flotation tank into two separate flotation tanks.

8. Apparatus for gas bubble flotation comprising:

a flotation tank the cross section of which essentially comprises an isosceles triangle, liquid inlet means located in a corner of the tank and directed inwardly for admitting into the tank liquid containing suspended matter and liquid admixed with gas bubbles, said liquid inlet means comprises a first inlet for liquid containing said suspended matter, and a second, separate inlet beneath said first inlet for liquid admixed with gas bubbles, a substantially horizontal inflow screen mounted above said first inlet for directing liquid flow uniformly into the tank and said second inlet having associated therewith a depressurization element for avoiding agglomeration of the gas bubbles, and a skimming device arranged along a wall of said tank which is opposite to said inlet means for skimming the flotate in the tank.

9. The apparatus as claimed in claim 8 wherein said tank is formed in its bottom wall with a sediment outflow channel, and at least one sentiment scraper mounted for sweeping movement at the bottom of the tank for moving sediment sludge into said outflow channel.

10. The apparatus as claimed in claim 8, wherein a plurality of triangular flotation tanks are arranged next to one another, each tank having common sides and said common sides being adjacently disposed.

11. The apparatus as claimed in claim 10, wherein at least two flotation tanks are provided, whose respective tank walls situated opposite the liquid inlets are situated next to one another, the two flotation tanks having a shared flotate discharge channel.

12. The apparatus as claimed in claim 8, wherein the flotation tank is of right-angled triangular design.

13. The apparatus of claim 8 wherein said inflow screen is pivotally mounted so that the amount and direction of flow through said first inlet can be controlled.

* * * * *